Aug. 28, 1956  M. G. MODELL  2,761,057
THERMOMETER ILLUMINATING DEVICE
Filed Jan. 21, 1954
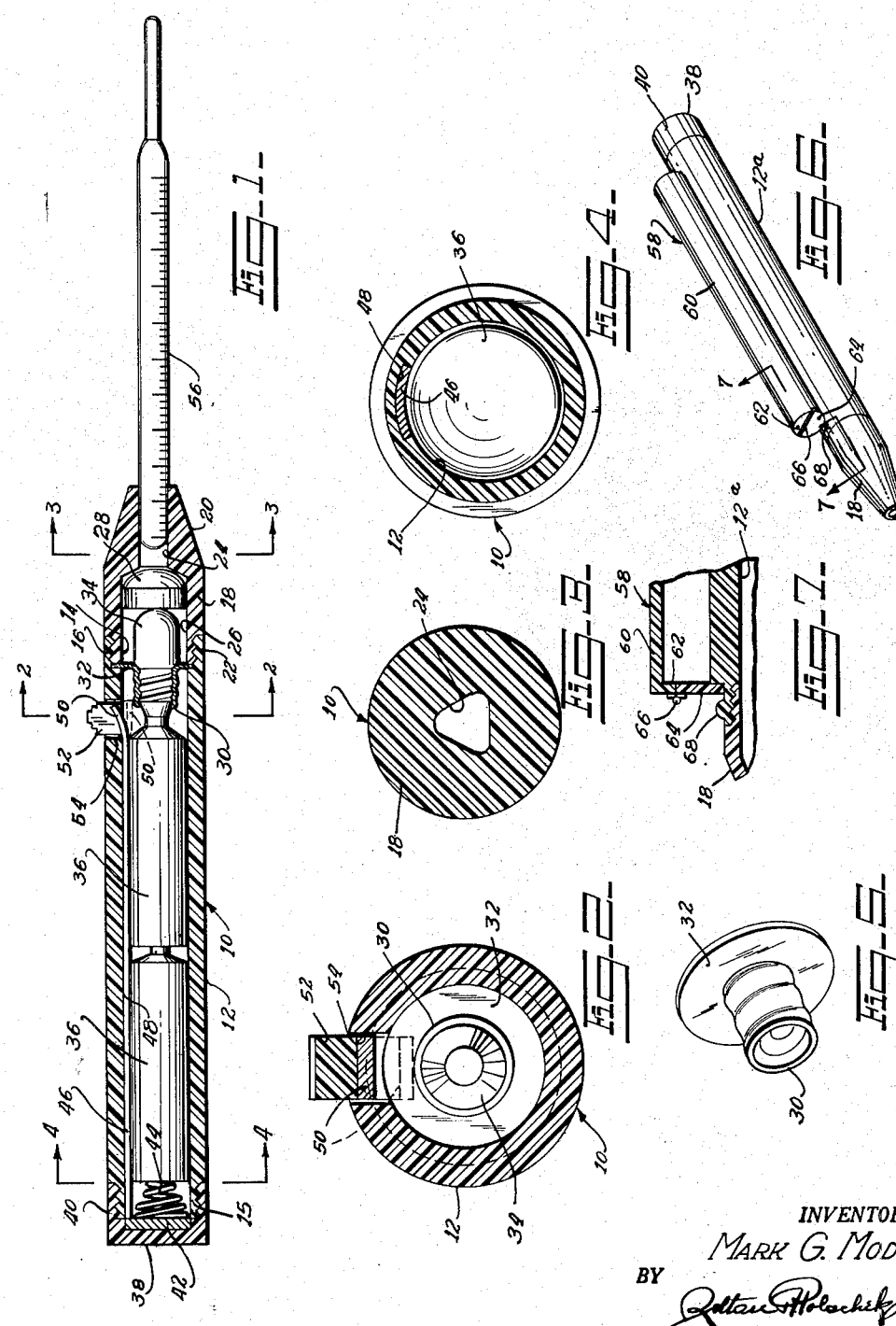
INVENTOR.
MARK G. MODELL
BY
ATTORNEY

United States Patent Office 2,761,057
Patented Aug. 28, 1956

2,761,057

THERMOMETER ILLUMINATING DEVICE

Mark G. Modell, West Hempstead, N. Y.

Application January 21, 1954, Serial No. 405,401

1 Claim. (Cl. 240—6.4)

The present invention relates to a device adapted to be used in association with a thermometer, for the purpose of illuminating the same in a manner that will facilitate the reading of the thermometer after use thereof.

The light in a sick room is often quite dim. As a result, it becomes very difficult to read a thermometer after the patient's temperature has been taken. This is particularly true with respect to lay persons who are comparatively inexperienced so far as the reading of a thermometer is concerned.

The main object of the present invention, accordingly, is to provide a thermometer illuminating device which will be efficiently adapted to light the thermometer from end to end thereof, thereby to facilitate measurably the reading of the thermometer.

Another object of importance is to provide, in a device of the type stated, a construction which will cause the illumination to be confined to the thermometer itself, thus to preclude the possibility of the light disturbing the ill person.

A further object of importance is to provide a device of the type stated which will make use of conventional flashlight batteries and of a flashlight bulb, thus to keep the cost of the device to a minimum.

A further object of importance is to provide a generally improved switch means adapted to facilitate the energizing of the bulb by a user, the switch means being so arranged as to be depressed responsive to gripping of the device in a natural manner, in a position in which the thermometer is properly located for reading thereof.

Yet another object is to provide, in at least one form of the invention, a combination structure wherein the illuminating device is permanently associated with a thermometer casing, thus to keep the thermometer and illuminating device together in a compact unit, ready for immediate use.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a longitudinal sectional view through an illuminating device formed in accordance with the present invention, a thermometer being shown in inserted position.

Fig. 2 is an enlarged transverse sectional view taken substantially on line 2—2 of Fig. 1, dotted lines showing "on" position of the switch.

Fig. 3 is a transverse sectional view on line 3—3 of Fig. 1.

Fig. 4 is a transverse sectional view on line 4—4 of Fig. 1.

Fig. 5 is a perspective view of the bulb support sleeve per se.

Fig. 6 is a perspective view of a modification in which the thermometer casing and illuminating device are assembled as a single unit.

Fig. 7 is an enlarged, detail sectional view taken substantially on line 7—7 of Fig. 6.

In the form of the invention shown in Figs. 1–5, the illuminating device has been designated generally by the reference numeral 10. The device includes an elongated, tubular body 12 which can be formed of plastic material or the like. The body 12, at one end thereof, is formed with a counterbore 14 internally threaded throughout its length, the counterbore defining, at the base thereof, a circumferential, internal shoulder 16 of the body 12.

A head 18, also of plastic material or the like, is formed at one end with a tapered extension 20. At its other end, head 18 is integrally provided with an externally threaded flange 22 extending circumferentially thereof, the flange 22 being reduced in outer diameter relative to the main outer diameter of head 18, for engaging the threads of counterbore 14.

The tapered extension 20 is formed with an axial bore 24 which, as shown in Fig. 3, is of a cross-sectional shape complementing that of the thermometer to be inserted therein. Thus, in the illustrated example the thermometer is of approximately triangular cross-section with rounded corners, the bore 24 being formed to a corresponding cross-sectional configuration. If the thermometer were fully circular in cross-section, the bore 24 would be correspondingly shaped.

In any event, the bore 24 opens at one end upon the outer or smaller end of the tapered extension 20, the bore 24 opening at its other end on a counterbore or recess 26 of the head 18. At the base of the counterbore 26, there is removably positioned a lens 28, this being of a type that will condense light passing therethrough, so as to form the light into a thin beam cast into the bore 24.

A bulb support sleeve 30 is integrally formed at one end with a circumferential flange 32 the periphery of which is engaged between shoulder 16 and the adjacent end of skirt 22, when the head 18 is threadedly connected to body 12. The bulb support sleeve is of conductive material, and threaded into the sleeve is the complementarily threaded base of a conventional flashlight bulb 34. The bulb 34 terminates adjacent the lens 28, thus to cause the light emanating from the bulb to pass through the lens and be condensed by the lens into a thin beam passing into bore 24.

A series of batteries 36, arranged in end to end, abutting relation, is provided, said batteries being inserted in the body 12, with the battery at one end of the series abutting against the base contact of the flashlight bulb. The batteries 36, preferably, are of the type that are of very small diameter in relation to their length.

A closure cap 38 is formed with a peripheral flange 40 internally threaded to engage the externally threaded end flange 15 of body 12. Cap 38 has mounted therein a conductive disc 42 engaged by one end of a spiral spring 44, the other end of which engages against the adjacent battery 36.

A conductive strip 46 is recessed in the inner surface of the body 12 as at 48 (Fig. 4), the conductive strip extending for substantially the full length of the body. When the cap 38 is attached to the body, the disc 42 will engage one end of the strip 46, thus to permit current to flow through spring 44, disc 42, and strip 46 when the device is in use.

The other end of strip 46 has been designated by the reference numeral 50, and fixedly secured to the end 50 of the strip is a switch button 52 projecting out of a slot 54 formed in body 12. The projecting portion of the switch button can be serrated or otherwise roughened, to facilitate depression thereof by a user.

The end portion 50 of the strip 46 is spring tensioned so as to normally spring to the full line position shown in Fig. 1, in which position it is disposed within the slot 54. However, against the spring tension of the strip end 50, the button 52 can be depressed by a user to shift said end 50 to the dotted line position shown in Figs. 1 and 2. This causes end 50 to be brought into contact with conductive sleeve 30, and it will be seen that a circuit will be closed, causing the bulb to be illumintaed.

A thermometer has been designated by the reference numeral 56 and is of wholly conventional design. In use of the illuminating device, and assuming that the thermometer has already been used for the purpose of detecting a temperature elevation of an ill person, the distal end of the thermometer is inserted in bore 24, the thermometer being frictionally but lightly gripped by the wall of the bore.

The button 52 is now depressed, and illumination of the flashlight bulb will cause light to pass through the lens 28, said light being condensed into a thin beam which will pass through the length of the thermometer body. It is important to note, in this regard, that the glass thermometer body will be effectively illuminated from end to end thereof, the light traveling longitudinally of the body, thus causing the column of mercury to stand out clearly, thereby to facilitate reading of the thermometer.

Despite the fact that the thermometer will be clearly illuminated, no undesirable, excess light will be cast by the device, that might tend to disturb an ill person.

In Figs. 6 and 7, there is shown a modified form designated generally by the reference numeral 58. In this form of the invention, the illuminating device proper is basically similar to that shown in Figs. 1–5, the tubular body of the illuminating device being designated by the reference numeral 12ª in Fig. 6.

Integral with the body 12ª, and only slightly shorter in length than the body, is a thermometer casing 60. Casing 60 is of tubular formation, and is integrally secured for its full length to the body 12ª, it being possible to mold the thermometer casing and the body 12ª as a single piece of plastic material.

In any event, thermometer casing 60 is permanently closed at one end, but is formed open at its other end, the open end of the thermometer casing being disposed adjacent the head 18. Formed upon the open end of the casing is a lip 62, a lid 64 being hingedly connected to said lip by means of the hinge 66. A projection 68 is molded upon the adjacent surface of body 12ª, to keep the lid 64 normally closed. However, by insertion of one's fingernail, the lid 64 can be snapped open, to permit removal or insertion of the thermometer.

By reason of this construction, the thermometer and illuminating device can be permanently kept together, and at such time as the thermometer is to be used, it is merely necessary to snap open the lid 64, remove the thermometer, and then use and illuminate the same in the manner previously described herein.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

An electrically illuminated thermometer comprising an elongated tubular insulating casing circular in cross-section and open at both ends, said casing having an opening in its side wall, a cap closing one end of the casing, a removable tapered head closing the other end of the casing and having a central bore communicating with the interior of the casing, a shoulder on the inner end of the head, dry cell batteries in the casing in end to end operative relation, spring means on the cap for maintaining said batteries in operative relation, an inner conducting sleeve clamped between the casing and head, a lamp bulb supported in the sleeve adjacent the head in operative engagement with one of the batteries, switch means protruding through the opening in the side wall of the casing and engageable with the sleeve for controlling the circuit through the lamp bulb, a thermometer seated in the bore of the head in line with the lamp bulb and extending outwardly of the casing and a separate magnifying lens seated on the shoulder of the head between the lamp bulb and end of the thermometer for magnifying the illumination of the thermometer in a lengthwise direction.

References Cited in the file of this patent

UNITED STATES PATENTS

| | | |
|---|---|---|
| 1,498,761 | Staples | June 24, 1924 |
| 2,166,282 | Benjafield | July 18, 1939 |
| 2,355,247 | Slocum | Aug. 8, 1944 |
| 2,554,854 | Chomes | May 29, 1951 |
| 2,665,498 | Mitchel | Jan. 12, 1954 |